Figure 1:
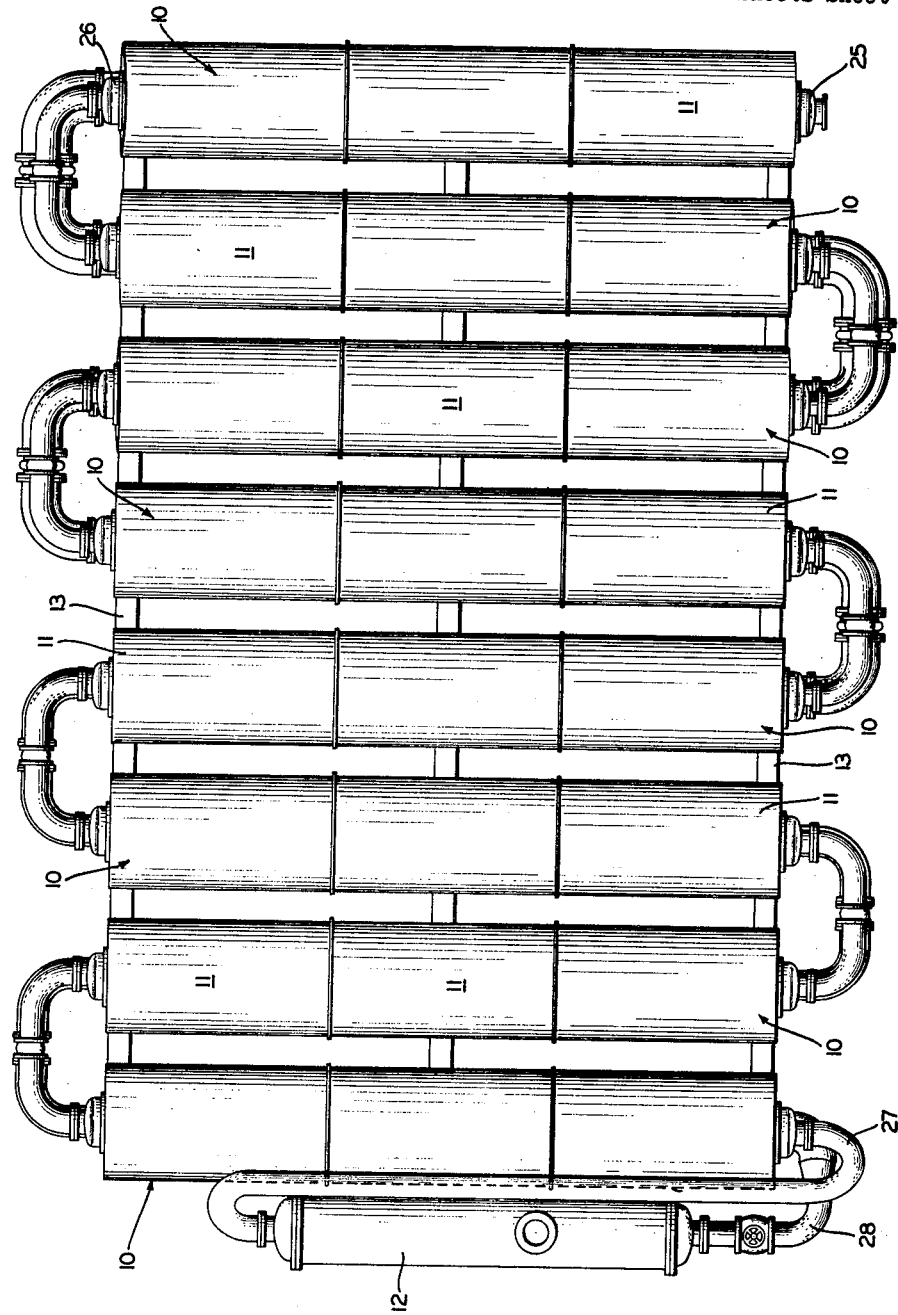

July 28, 1964  K. B. RIS ETAL  3,142,381
EVAPORATOR CONSTRUCTION
Filed April 10, 1961  3 Sheets-Sheet 1

INVENTORS
Kenneth B. Ris and
BY Stewart F. Mulford
Frease, Bishop, Johns & Schick
ATTORNEYS INVENTORS
Kenneth B. Ris and
Stewart F. Mulford
BY Freese, Bishop, Johns & Schick
ATTORNEYS

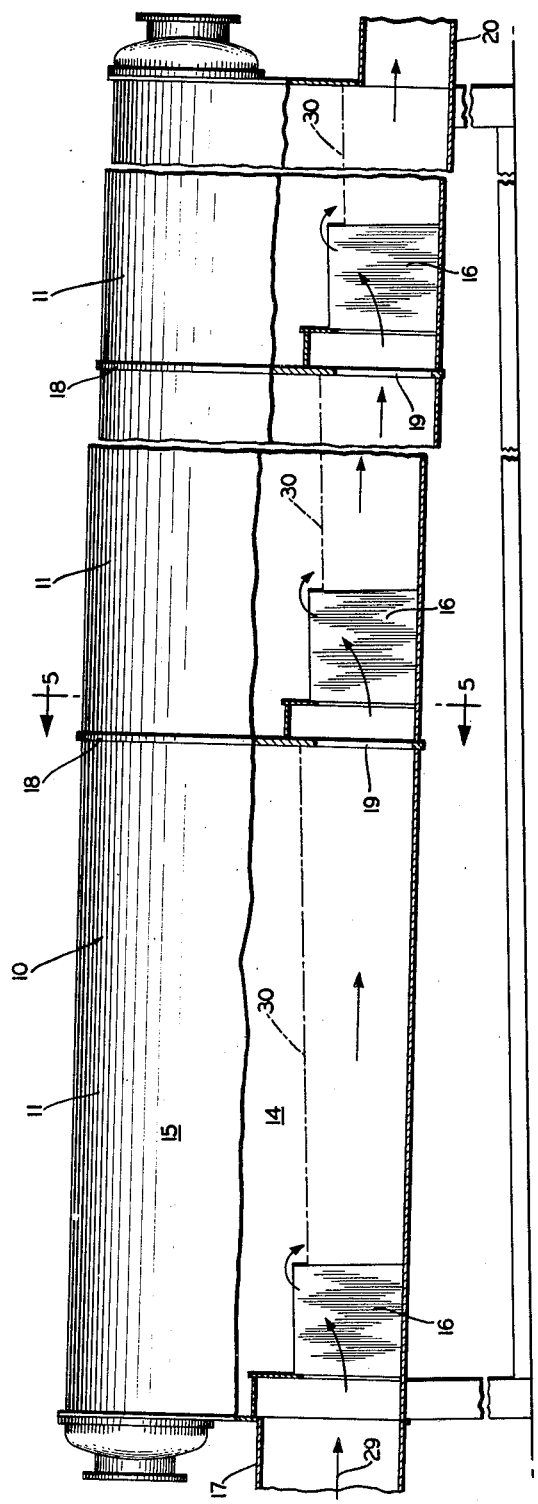
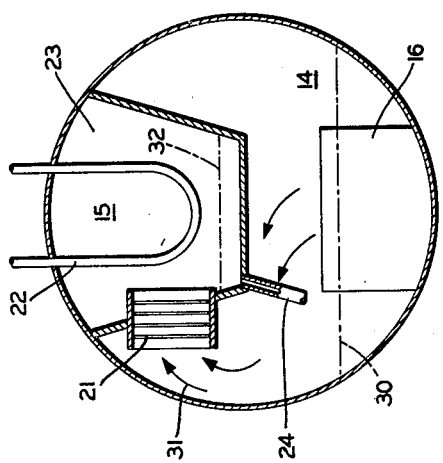

3,142,381
EVAPORATOR CONSTRUCTION
Kenneth B. Ris, Massillon, Ohio, and Stewart F. Mulford, Falls Church, Va., assignors, by mesne assignments, to Baldwin-Lima-Hamilton Corporation, Philadelphia, Pa., a corporation of Pennsylvania
Filed Apr. 10, 1961, Ser. No. 101,772
3 Claims. (Cl. 202—173)

Our invention relates to improvements in evaporator construction for use in distilling sea water and the like, and more specifically, to flash evaporators of the multi-stage type. Even more specifically, our invention relates to improvements in flash evaporators of the so-called "tandem" construction, wherein a series of flash evaporator chambers are contained within a single shell with the total evaporator construction including one or more such multi-stage shells.

In flash evaporators of the "tandem" type, two or more evaporator chambers or stages are contained within the same shell with possibly a number of such shell units making up the total evaporator construction. In this form of evaporator construction, each chamber or stage is provided with a feed water portion within which a certain part of the sea water is vaporized and a condensing portion within which these vapors are condensed. The cooling water for the condensing tubes in the condensing portion is preferably raw sea water being preheated preparatory to the evaporation of a part thereof within the evaporator construction feed water portions. Furthermore, the operating temperatures and pressures of the chambers or stages decreases progressively from the first evaporator stage to the last.

Thus, the raw sea water entering the evaporator construction passes through the condensing tubes of the last or lowest temperature stage and progressively through the condensing tubes of subsequent stages to the highest temperature stage. Thereafter, this preheated sea water is normally further heated in an auxiliary salt water heater from which the sea water is directed into the feed water portion of the highest temperature stage to begin vaporization. Finally, the sea water passes progressively between and into the feed water portions of the various stages from the highest temperature stage to the lowest temperature stage with a certain amount of this sea water being flashed into vapor in each stage, which vapor is condensed by the condensing tubes of that particular stage resulting in the desired distillate.

It is thought that the most efficient design or multi-stage flash evaporator plant requires that equal temperature differentials exist between all adjacent stages as the sea water passes from stage to stage in the flash chambers, that is, equal temperature decreases between adjacent stages. Due to the nature of the relationship between saturation temperatures and saturation pressures of steam, however, this requires that the pressure differences or differentials between the flash chambers of adjacent stages be different or unequal. Rather, these pressure differentials will instead be relatively greater at the high temperature end of the evaporator, that is, the end of the evaporator where the chambers are operating at the highest temperatures, and these pressure differentials will become progressively less as the seat water approaches the low temperature end of the evaporator or the lowest temperature stage.

In certain cases, and this depends on many factors including the particular temperatures and pressures at which the various stages of the evaporator are operating, the pressure difference or pressure differential between stages can become so slight that this pressure differential is insufficient to move the sea water physically between the feed water portions of the various stages. This is particularly true in multi-stage evaporators having a great number of stages and is due to the fact that pressure losses necessarily occur as the result of the flow of the sea water through and between the various stages.

Where the individual stages of a multi-stage evaporator are formed each in a separate shell, the foregoing difficulty can be overcome simply by providing auxiliary pumps for the sea water between various stages or shells as required, or by mounting these single stage shells at progressively lower levels in order to take advantage of the water pressure head from gravity resulting between the shells. In either case, however, these forms of constructions can become prohibitive from the cost standpoint as well as the space requirements for the individual single stage shells.

It is, therefore, highly desirable to use the "tandem" type of evaporator construction wherein two or more stages are contained within a single shell with only suitable stage division plates being required between stages within a single shell. If such multi-stage shells are simply mounted with one shell below the next in order to provide sufficient water pressure head from gravity to move the sea water through the various stages of a single shell and from one shell to the next, such pressure head may not be provided without a prohibitive build-up of sea water within the highest temperature stage of a particular shell.

It is, therefore, a general object of the present invention to provide a multi-stage flash evaporator construction of the "tandem" type which solves the foregoing problems and difficulties.

It is a primary object of the present invention to provide a multi-stage flash evaporator construction of the "tandem" type which may be easily and simply adapted and adjusted for use under particular operating conditions.

It is a further object of the present invention to provide a multi-stage flash evaporator construction of the "tandem" type in which certain of the shells containing the lower temperature and pressure stages are sloped to provide the additional necessary water pressure head from gravity to move the sea water through the various stages of a particular shell and between the various shells.

Finally, it is an object of the present invention to provide a multi-stage flash evaporator construction of the "tandem" type satisfying the foregoing objects in a simple and efficient manner and at a minimum of expense.

These and other objects are accomplished by the parts, constructions, arrangements, combinations and subcombinations comprising the present invention, the nature of which is set forth in the following general statement, a preferred embodiment of which—illustrative of the best mode in which applicants have contemplated applying the principles—is set forth in the following description and illustrated in the accompanying drawings, and which is particularly and distinctly pointed out and set forth in the appended claims forming a part hereof.

In general terms the evaporator construction comprising the present invention may be stated as being of the multi-stage flash evaporator type in which two or more evaporator chambers or stages are contained within a single shell. Furthermore, the construction may include a series of such shells of the so-called "tandem" type with at least certain of the shells containing the lower temperature and pressure stages being sloped sufficiently to provide a water pressure head from gravity between evaporator stages which, in combination with the normal operating pressure differential between these lower temperature stages, is sufficient for moving the sea water through the feed water portions of the evaporator stages or chambers and between the shells.

More specifically the evaporator construction of the present invention may be stated as including at least one longitudinally extending shell having at least first and second longitudinally adjacent flash evaporator chambers, with each chamber having a feed water portion receiving sea water to be flashed and a condensing portion for condensing vapors flashed from the feed water portion. Furthermore, the construction includes means for directing sea water into the first stage feed water portion and between the first and second stage feed water portions and from the second stage feed water portion. Finally, the pressure within the first stage is greater than the pressure within the second stage providing a pressure differential therebetween, and the shell is longitudinally sloped from the first stage toward the second stage providing a water pressure head between said stages from gravity at least sufficient that the combination of said pressure differential and said water pressure head will move the sea water between the feed water portions of said stages and through the shell.

Figure 2:
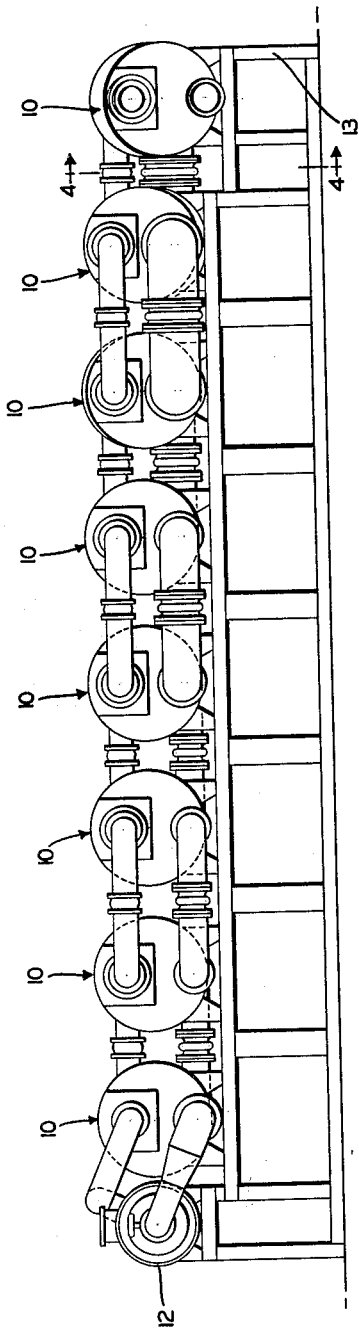
Figure 3:
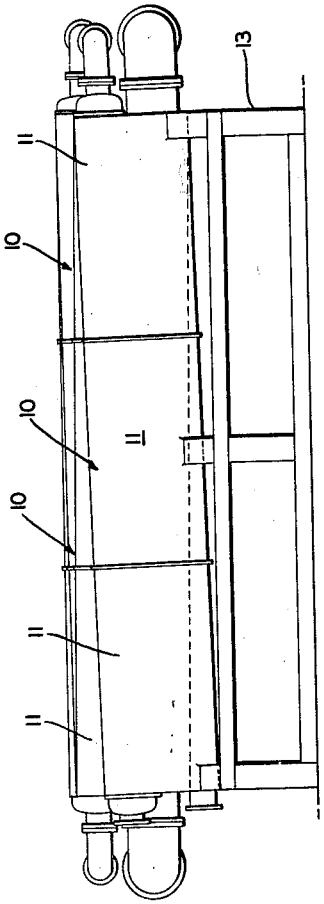

By way of example, an embodiment of the improved evaporator construction of the present invention is illustrated in the accompanying drawings forming a part hereof, wherein like numerals indicate similar parts throughout the several views and in which:

FIG. 1 is a top plan view of a multi-stage flash evaporator construction having shells of the "tandem" type and incorporating the principles of the present invention;

FIG. 2, a side elevation of the multi-stage flash evaporator construction of FIG. 1;

FIG. 3, an end elevation of the multi-stage flash evaporator construction of FIG. 1;

FIG. 4, an enlarged fragmentary view, part in elevation and part in section, showing a portion of the interior of the lowest temperature shell looking in the direction of the arrows 4—4 in FIG. 2; and FIG. 5, a partially diagrammatic section view looking in the direction of the arrows 5—5 in FIG. 4.

As illustrated in the drawings, the flash evaporator construction of the present invention may be comprised of a series of longitudinally extending shells 10 positioned laterally adjacent and each containing three longitudinally adjacent evaporator chambers or stages 11. As is further shown, the shells 10 along with a salt water heater 12 are supported spaced from a supporting surface by usual structural supporting members 13.

All of the shells 10 are generally similar in internal construction with each evaporator chamber 11, as shown in FIG. 4 and illustrated diagrammatically in FIG. 5, including a feed water portion 14 and condensing portion 15. The feed water portions 14 may include the usual distribution boxes 16 which open upwardly and through which the salt water to be evaporated enters the particular chamber.

The distribution box 16 of the first or higher temperature chamber 11 of the particular shell 10 receives the sea water to be evaporated through a conduit 17, with the three chambers being separated by usual partition plates 18, each having the predetermined size opening 19 for feeding the sea water from one stage to the distribution box of the next stage. Finally, the sea water leaves the particular shell 10 from the last or lower temperature chamber 11 through the conduit 20.

The condensing portion 15 of each chamber 11 is shown diagrammatically in FIG. 5 and may include the usual vapor separator 21, the condensing tubes 22 within the condensing chamber 23 and the distillate drain 24. The condensing tubes 22 of the chambers 11 are preferably connected whereby the cooling water passes therethrough from the lowest temperature chamber 11 to the highest temperature chamber 11 or from right to left as shown in FIG. 4, with these condensing tubes further being connected between various shells 10 to provide a continuous flow from the lowest to the highest temperature shell 10.

As shown in FIGS. 1 through 3, the various shells 10 are operably connected in the usual manner with the raw sea water which is being preheated passing from the lowest temperature and lowest pressure evaporator chamber 11 of the lowest temperature shell 10 progressively through the laterally adjacent remaining shells 10 and ultimately to the highest temperature and highest pressure evaporator chamber 11 of the highest temperature shell 10, that is, from the righthand side to the lefthand side as shown in FIGS. 1 and 2. This raw sea water of course, flows through the condensing tubes 22 of each of the chambers 11 serving as the condensing medium within the condensing tubes 22, and the flow is in the opposite longitudinal direction in each laterally adjacent shell 10.

Thus, as shown in FIG. 1, the flow of the raw sea water being preheated would be from the lower righthand end of the righthandmost shell 10, entering through the conduit 25 into the lowest temperature and lowest pressure evaporator chamber 11 and into the condensing tubes 22 of this evaporator chamber. Further, this raw sea water will pass progressively through the condensing tubes 22 of the remaining evaporator chambers 11 of this particular shell 10, exiting through the conduit 26. After passing through conduit 26, the raw sea water will then enter the lowest temperature and lowest pressure chamber of the next laterally adjacent shell 10, passing in this manner progressively through all of the condensing tubes 22 of all of the evaporator chambers 11 in each of the shells 10 to finally exit from the highest pressure and highest temperature evaporator chamber 11 of the lefthandmost shell 10 through the conduit 27.

The flow of the sea water through the evaporator chambers 11 of the shells 10 after this sea water has been preheated and is ready for evaporation or distillation is, of course, exactly opposite in longitudinal and lateral direction from the flow of the sea water being preheated. This flow of sea water, after the preheating, is through the conduit 28 into the feed water portion 14 of the highest temperature and highest pressure evaporator chamber 11 of the highest temperature and highest pressure evaporator shell 10. The sea water being evaporated ultimately leaves the feedwater portion 14 of the lowest temperature and lowest pressure evaporator chamber 11 of the lowest temperature and lowest pressure shell 10 through the conduit 20, as previously described.

Thus, the sea water to be evaporated enters the overall evaporator construction through the conduit 25 into the condensing tubes 22 of the lowest temperature and lowest pressure evaporator chamber 11, passes progressively through the condensing tubes of each of the evaporator chambers to ultimately leave the highest temperature and highest pressure evaporator chamber through the conduit 27. This sea water, at this point being partially preheated as a result of condensing the vapors in the various evaporator chambers, then passes through the salt water heater 12, which may derive its heat from any usual source, wherein the sea water is raised to its maximum temperature and is in a state preparatory to the actual evaporating or distilling process.

The sea water then leaves the salt water heater 12 through the conduit 28 and passes into the feed water portion 14 of the highest temperature and highest pressure evaporator chamber 11, flowing progressively through the feed water portions 14 of the evaporator chambers and from shell to shell and finally leaving the lowest temperature and lowest pressure evaporator chamber through the conduit 20.

Referring to FIGS. 4 and 5, the general flow of sea water through each of the shells 10 is substantially the same, with the lowest temperature lowest pressure shell being illustrated in FIG. 4, and the evaporation in each of the evaporator chambers 11 being illustrated diagrammatically in FIG. 5. As shown in FIG. 4, the lowest pressure and lowest temperature evaporator chamber 11 is at the righthand side of the highest pressure and highest temperature evaporator chamber is at the lefthand side, with the sea water being preheated flowing from right to left and the sea water being evaporated flowing from left to right.

Thus, the sea water being evaporated enters through the conduit 17 into the distribution box 16 of the feed water portion 14 in the highest pressure and highest temperature chamber 11, with such flow being illustrated by the arrow 29. This sea water overflows the distribution box 16 forming the water level illustrated by the broken line 30.

The water level 30 in each of the evaporator chambers 11 is, of course, above the height of the exit opening from that particular chamber, which in this case would be above the height of the opening 19 of the partition plate 18, in order to prevent blow through from one chamber to the next and so that each chamber maintains its own individual pressure, which pressure decreases progressively from chamber to chamber with the progressive decrease in temperature of the sea water. The flow through the remaining evaporator chambers is substantially the same with the remaining sea water not vaporized leaving this particular shell 10 through the conduit 20.

As shown in FIG. 5, as a certain portion of the sea water in the feed portion 14 of each evaporator chamber 11 vaporizes, this vapor travels upwardly within the particular chamber into the condensing portion 15 thereof through the vapor separator 21, as illustrated by the arrows 31. As the vapor enters the condensing chamber 23, it comes into contact with the condensing tubes 22 where heat is removed from this vapor and passes into the sea water being preheated which is flowing through the condensing tubes, thereby causing the vapors to condense and forming distillate.

The distillate may collect at the lower portion of the condensing chamber 23 as illustrated by the broken lines 32. Finally, the distillate may be drained from the condensing chamber 23 and collected through the distillate drain 24 in the usual manner.

As previously discussed, it is thought that the most efficient construction of multi-stage flash evaporators is one in which the salt water being preheated by passing through the condensing tubes 22 of the evaporator chambers 11 undergoes the same or an equal temperature rise in each of these chambers 11, and also that this salt water undergoes the same or an equal temperature decrease in each of the evaporator chambers 11 as it passes through the feed water portions 14 thereof during the evaporation. Thus the difference in pressure or the pressure differentials between the various evaporator chambers 11 will be unequal and will be relatively greater at the high temperature end of the overall evaporator construction and will become progressively smaller as the sea water being evaporated approaches the low temperature end of the overall evaporator.

As applied to the present evaporator construction illustrated, and referring to FIG. 1, the pressure differential between the evaporator chambers 11 within any one shell 10 or between laterally adjacent shells 10 will be relatively great at the high temperature or lefthand end of the overall evaporator construction and these pressure differentials between evaporator chambers 11 in and between the shells 10 will decrease progressively to the low temperature end or the righthand side of the overall evaporator construction. In the particular embodiment shown in the drawings, these pressure differentials between and through the first five shells 10, beginning at the high temperature end or adjacent the salt water heater 12, are sufficient for moving the salt water being evaporated through the feed water portions 14 of these evaporator chambers 11.

In the last three shells 10, however, these pressure differentials have decreased to the point that they are no longer sufficient, at least alone, to cause the flow of the sea water between the feed water portions 14 of the evaporator chambers 11 and from one shell 10 to the next.

Thus, as shown in the drawing, the last three shells 10 are longitudinally sloped progressively from one end to the other thereof so that a sea water pressure head resulting from gravity is built up between the evaporator chambers 11 to augment the pressure differentials between evaporator chambers and to thereby maintain the proper flow of sea water between the evaporator chambers and through the shells.

The particular degree of sloping of any of the shells 10 will, of course, be dependent on the particular conditions encountered with a particular evaporator construction. Furthermore, the number of shells 10 which it is necessary to slope will also be dependent on the particular evaporator construction as well as the particular conditions of water temperature and flash chamber pressure under which it operates.

The important point is that any number or all of the shells 10 may be sloped longitudinally as required in order to maintain the proper operating conditions. Those shells 10 within which sufficient pressure differentials are provided between evaporator chambers 11 for moving the sea water being evaporated through the feed water portions 14 of these shells and between adjacent shells may be mounted horizontal, and at that point at which the pressure differentials are no longer sufficient alone to produce this flow, the shells 10 may be sloped longitudinally the degree required. It is also obvious that this longitudinal sloping of the shells 10 can be regulated and adjusted at the site of operation and when pilot operation has begun in order to provide the most efficient functioning for the evaporator construction. It is also possible that, as temperature conditions change seasonally at the particular site of operation, the particular sloping required could be adjusted for these seasonal changes in the temperature of the sea water being evaporated.

Thus the particular sloping required for any given shell 10 will be that sufficient to produce at least the minimum sea water pressure head from gravity necessary to augment the pressure differentials between the particular evaporator chambers 11 in that shell and between that shell and the next lower temperature shell for moving the sea water being evaporated through the evaporator chambers 11 of that particular shell and into the next lower temperature shell. Where the pressure differentials alone are sufficient, no sloping is required.

Although the term "sea water" has been used in illustrating and describing the present multi-stage flash evaporator construction, it should be understood that the principles of the present invention are equally applicable to other forms of salt water or brackish solutions which it might be desirable to evaporate or distill.

In the foregoing description, certain terms have been used for brevity, clearness and understanding, but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claims.

We claim:

1. In flash evaporator construction for distilling sea water and the like in multi-stage, generally horizontally disposed, tandem-arranged evaporator chambers of a type in which feedwater flows between successive high to low temperature stages, in which equal temperature differentials and corresponding unequal pressure differentials exist between adjacent stages, and in which the pressure differentials between adjacent low temperature stages are insufficient to maintain feedwater flow from one stage to the adjacent stage; an elongated tubular shell; support means; means mounting the shell on the support means in a generally horizontally disposed position; transverse partition means intermediate the ends of the tubular shell dividing the shell into elongated, tandem-arranged adjacent evaporator chambers each having tubular wall portions formed by successive longitudinally adjacent tubular portions of the shell; means dividing each chamber into a feedwater receiving portion and a communicating condensing portion for condensing vapors produced by vaporization of part of the feedwater in the chamber receiving portion; the evaporator chamber receiving portions each being provided with inlet and outlet means including a passageway formed in each partition means serving as the feedwater outlet means for one chamber and the feedwater inlet means for the next lower temperature stage chamber; feedwater distribution box means in each chamber receiving portion communicating with the inlet means for such chamber; the feedwater distribution box means in any chamber being so constructed, arranged, and related to the outlet means for such chamber as to distribute a body of feedwater elongated lengthwise of the shell in said chamber with a surface elevation level above the outlet means for such chamber, thereby separating the internal pressures in the successive chamber stages above the levels of the elongated feedwater bodies therein so as to maintain pressure differentials between adjacent chambers; and the mounting means for the shell on the support means being constructed to locate the shell with a predetermined slope continuously downwardly lengthwise from higher to lower temperature stage chambers in said shell; whereby the respective levels of the elongated bodies of feedwater in the successive chambers in the shell are successively lower from higher to lower temperature stage chambers, thereby forming a feedwater pressure head between each chamber and its next adjacent chamber in said shell; and whereby the internal pressure differentials between adjacent chambers augmented by the feedwater pressure head in any chamber in said shell resulting from the shell slope maintains a flow of feedwater from chamber to chamber through said shell.

2. Flash evaporator construction as defined in claim 1 in which the transverse partition means intermediate the ends of the tubular shell divide the shell into at least three elongated, tandem-arranged adjacent evaporator chambers each having tubular wall portions formed by successive longitudinally adjacent tubular portions of the shell.

3. In flash evaporator construction for distilling sea water and the like in multi-stage, generally horizontally disposed, tandem-arranged evaporator chambers of a type in which feedwater flows between successive high to low temperature stages located in a series of end connected high to low temperature shells, in which equal temperature differentials and corresponding unequal pressure differentials exist between adjacent stages and between the last stage of one shell and the first stage of the next successive shell, and in which pressure differentials between adjacent stages of low temperature shells and between low temperature shells are insufficient to maintain feedwater flow from one stage to the adjacent stage and between successive shells; a series of elongated, end connected, tubular shells; support means; means mounting the shells on the support means in generally horizontal-disposed positions; transverse partition means intermediate the ends of each tubular shell dividing the shells into elongated, tendem-arranged adjacent evaporator chambers each having tubular wall portions formed by successive longitudinally adjacent tubular portions of the shells; means dividing each chamber of each shell into a feedwater receiving portion and a communicating condensing portion for condensing vapors produced by vaporization of part of the feedwater in the chamber receiving portion; the evaporator chamber receiving portions each being provided with inlet and outlet means including a passageway formed in each partition means serving as the feedwater outlet means for one chamber and the feedwater inlet means for the next lower temperature stage chamber; the end connections between the successive high to low temperature shells forming the feedwater outlet means for the lower temperature stage chamber of one shell and the feedwater inlet means for the higher temperature stage chamber of the next successive shell; feedwater distribution box means in each chamber receiving portion communicating with the inlet means for such chamber; the feedwater distribution box means in any chamber being so constructed, arranged, and related to the outlet means for such chamber as to distribute a body of feedwater elongated lengthwise of the particular shell in said chamber with a surface elevation level above the outlet means for such chamber, thereby separating the internal pressures in the successive chamber stages and between successive shells above the levels of the elongated feedwater bodies therein so as to maintain pressure differentials between adjacent chambers of each shell and between chambers of successive shells; the mounting means for the shells on the support means being constructed to locate certain of the higher temperature shells horizontally; and the mounting means for the shells on the support means being constructed to locate the remaining lower temperature shells with predetermined slopes continuously downwardly lengthwise from higher to lower temperature stage chambers in said shells and between successive shells; whereby the respective levels of the elongted bodies of feedwater in the successive chambers in said remaining lower temperature shells are successively lower from higher to lower temperature stage chambers and between successive lower temperature shells, thereby forming a feedwater pressure head between each chamber and its next adjacent chamber in said remaining lower temperature shells and between successive of said remaining lower temperature shells; and whereby the internal pressure differentials between adjacent chambers and between successive shells of said certain higher temperature shells maintains a flow of feedwater from chamber to chamber through and between said certain higher temperature shells, and the internal pressure differentials between adjacent chambers and between successive shells of said remaining lower temperature shells augmented by the feedwater pressure head in any chamber in said shells and between the chambers of successive shells resulting from the shell slopes maintains a flow of feedwater from chamber to chamber and from shell to shell through said remaining lower temperature shells.

References Cited in the file of this patent

UNITED STATES PATENTS

| | | |
|---|---|---|
| 85,160 | Arnold | Dec. 22, 1868 |
| 271,023 | Boomer | Jan. 23, 1883 |
| 408,660 | Herr | Aug. 6, 1889 |
| 496,615 | Monsanto | May 2, 1893 |
| 520,438 | Leist | May 29, 1894 |
| 1,036,637 | Kayser | Aug. 27, 1912 |
| 1,193,359 | Castro | Aug. 1, 1916 |
| 2,759,882 | Worthen et al. | Aug. 21, 1956 |
| 2,934,477 | Siegfried | Apr. 26, 1960 |
| 2,944,599 | Frankel | July 12, 1960 |